United States Patent

[11] 3,610,586

[72] Inventors Howard Price
Kings Point, N.Y.;
Seymour Wallick, Clifton, N.J.; Harvey
Diamond, Brooklyn, N.Y.
[21] Appl. No. 842,464
[22] Filed July 17, 1969
[45] Patented Oct. 5, 1971
[73] Assignee International Patents & Development
Corporation
Kings Point, N.Y.

[54] MIXING DEVICE
17 Claims, 15 Drawing Figs.
[52] U.S. Cl. ..................................................... 259/15,
206/47 A, 222/80, 259/88
[51] Int. Cl. ..................................................... B01f 9/12,
B01f 15/02
[50] Field of Search .......................................... 259/15, 51,
53, 82, 88, DIG. 20; 206/47 A; 222/80

[56] References Cited
UNITED STATES PATENTS
2,527,992  10/1950  Greenberg.................... 259/DIG. 20
3,209,387  10/1965  Lukesch....................... 206/47 A UX
3,255,924   6/1966  Modderno..................... 206/47 A X Primary Examiner—William I. Price
Assistant Examiner—Alan I. Cantor
Attorney—Sparrow and Sparrow ABSTRACT: A dental mixing arrangement in which prepackaged ingredients to be mixed for dental applications are stored within a container which maintains the ingredients isolated from each other prior to usage. The ingredients are intermixed by placing the container in a mixing device which rotates the base of the container while maintaining the cover stationary. A knife portion integral with the container bottom severs an isolating membrane stretched over a portion of the cover, during operation of the mixer, and permits the ingredients to mix. Through rotation of the container bottom, a homogeneous mixture is realized with a mixing paddle integral with the stationary container top or cover.

PATENTED OCT 5 1971

INVENTORS.
HARVEY DIAMOND
HOWARD PRICE
BY SEYMOUR WALLICK

SPARROW AND SPARROW
ATTORNEYS

FIG.5
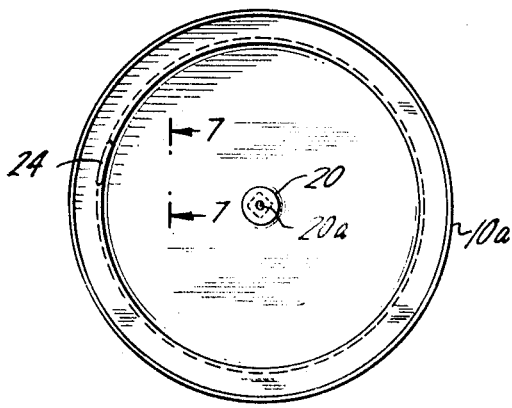
FIG.5a
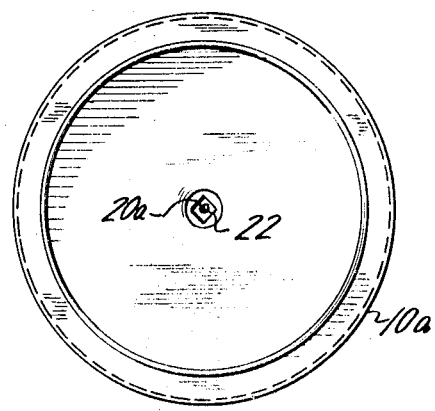
FIG.6
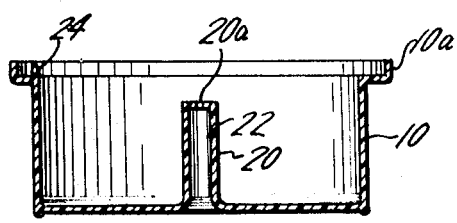
FIG.8
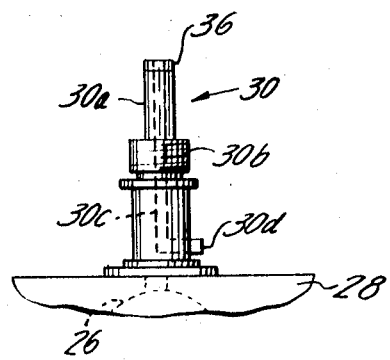
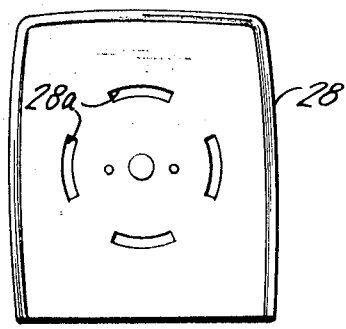
FIG.9
FIG.7
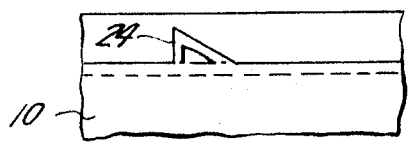
INVENTORS
HARVEY DIAMOND
HOWARD PRICE
BY SEYMOUR WALLICK
SPARROW AND SPARROW
ATTORNEYS

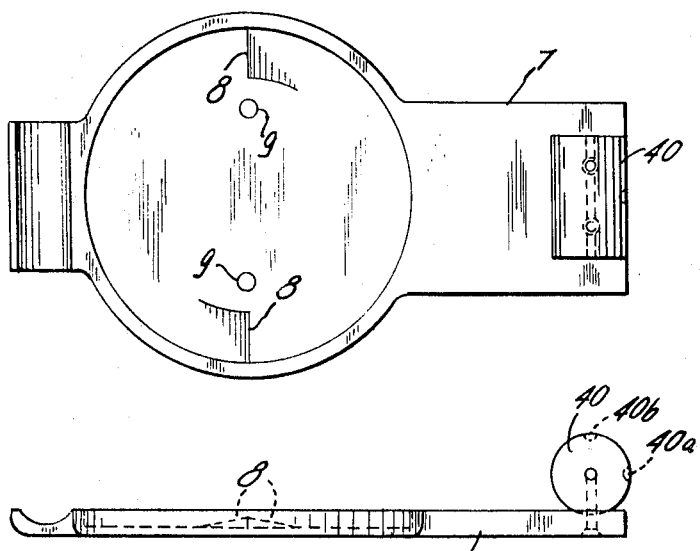
FIG.10
FIG.12
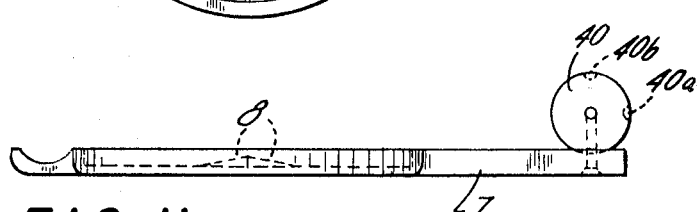
FIG.11
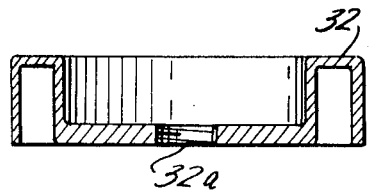
FIG.13
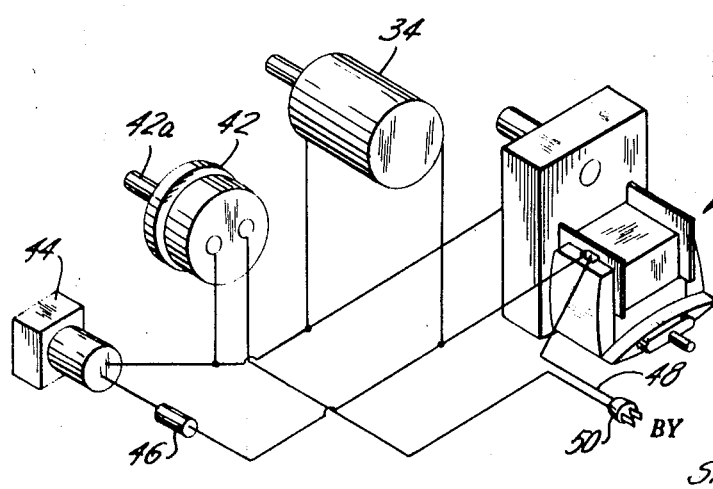
FIG.14
INVENTORS.
HARVEY DIAMOND
HOWARD PRICE
SEYMOUR WALLICK
BY SPARROW AND SPARROW
ATTORNEYS

3,610,586

MIXING DEVICE

BACKGROUND OF THE INVENTION

In pursuing dental work, it is quite common to mix various ingredients in preparation for the taking of impressions and other such similar operations, well known in the dental art. In a large number of cases, the mixing process cannot be carried out until very shortly before the mixture is to be used.

In the past, the dental practitioner would mix the required ingredients in a receptacle immediately prior to actual use of the mixture. In preparing the mixture, he would estimate the quantities of the ingredients to be intermixed. As a result of such rough measuring of the ingredients, an optimum mixture was rarely realized. The dentist furthermore was required to familiarize himself with the numerous different types of mixtures and their ingredients, (such as, for example, plaster, silicone, latex, and alginates). Because the mixing was done by hand, the dentist had to work rapidly, so that the mixture would not set before actual use.

Accordingly, it is a desideratum of the present invention to overcome the foregoing inconveniences and disadvantages by providing an arrangement in which the ingredients to be mixed, for dental applications, are premeasured and held within a prepackaged container, separate from each other until ready for use.

SUMMARY OF THE INVENTION

A mixing arrangement for dental applications. A mixing device having a rotatable turntable in which a container with the ingredients to be intermixed is placed on the rotatable of the mixing device. A spindle of the turntable projects into the bottom of the container for the purpose of rotating the latter with the turntable when actuated. The container comprises two separable portions, top and bottom, respectively. One of the ingredients to be intermixed may be held within the bottom portion of the container, whereas the other ingredient, which may be in the form of a liquid, is stored within a section or compartment of the top or cover portion of the container. The ingredient within the top portion of the container, held within the compartment, is covered by a membrane or other thin sheet of material. The container top portion is gripped and held stationary by the mixing device, whereas the bottom portion of the container is freely rotatable with the turntable.

When the turntable is rotated through the action of a motor, a knife edge portion adjacent the rim of the bottom portion of the container, cuts the membrane and allows the ingredient within the top or cover portion of the container to flow into the rotating bottom portion of the container. The top portion of the container, furthermore, has a paddle or mixing blade portion projecting downward into the bottom portion of the container. As a result of the rotation of the bottom portion of the container relative to the top or cover portion of the container, rapid and thorough intermixing of the ingredients is realized.

As stated hereinbefore, there are two parts or portions to the container, namely a top portion and a bottom portion. The top portion has a storage compartment for a liquid; for example, water, which is held within the compartment by a diaphragm. The water-holding portion preferably takes up a space of about one-half of the top portion of the container. The other half of the top portion of the container is provided with a mixing blade. The bottom portion of the container houses the powder to be mixed. In the center of the bottom portion of the container is a keyed hole or socket, so that when the socket of the container is positioned in engagement with a corresponding shaft or spindle of a rotating table, the container will rotate along with it. On the upper edge of the container, preferably molded into the container, there is a knife edge which is used for slitting the diaphragm to permit water from the top container to drain into the container holding the powder to be mixed. The two portions of the container are permitted to rotate within themselves. When the bottom portion of the container is in rotation, the top or upper portion of the container is held stationary by a permanently fixed retainer located on the mixer. There are cooperating or mating means located on top of the upper portion of the container and on the underside of the fixed retainer, for holding the top or upper portion of the container stationary. While the bottom portion of the container is in rotation, the mixing blade from the top portion of the container is in a stationary position, thus causing a mixing action to take place within the container. After the mixture cycle is completed, the two portions or parts of the container are separated and the mix itself can be spatulated out from the bottom part or section for use.

It is an object of the present invention to provide an arrangement in which the ingredients to be mixed, for example, for dental applications are premeasured and held within a prepackaged container separate from each other until ready for use.

It is also an object of the present invention to provide for the prepackaging of ingredients for dental applications, in which at least one of the ingredients is a liquid.

A further object of the present invention is to provide an arrangement for the intermixing of ingredients for dental applications, in which the ingredients are thoroughly and rapidly intermixed to result in a homogeneous mixture within a substantially short time interval, prior to the use of the mixture.

It is a specific object of the present invention to provide a dental arrangement of the aforementioned character which may be operated by the user in a simple manner and without previous training.

Various further and more specific purposes, features and advantages will clearly appear from the detailed description given below taken in connection with the accompanying drawings which form part of this specification and illustrate merely by way of example embodiments of the device of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings, in which

FIG. 5 is a plan view of the container bottom portion;

FIG. 5a is a bottom view of the bottom portion of the container;

FIG. 6 is a sectional side view of the container bottom portion;

FIG. 7 is a partial side view taken along line 7—7 in FIG. 5;

FIG. 8 is a partial elevational view of the spindle drive for rotating the container bottom portion;

FIG. 9 is a plan view of the mixer housing;

FIG. 10 is a bottom view of the retaining member for holding the container top stationary while rotating the container bottom;

FIG. 11 is an end view of the retaining member of FIG. 10;

FIG. 12 is a side view of the bracket for mounting the retaining member of FIG. 10;

FIG. 13 is a sectional side view of the turntable used to rotate the container bottom;

FIG. 14 is an electrical interconnection diagram of the electrically operated elements of the mixer of FIG. 1.

DESCRIPTION OF THE PREFERRED EMBODIMENTS

Figure 3:
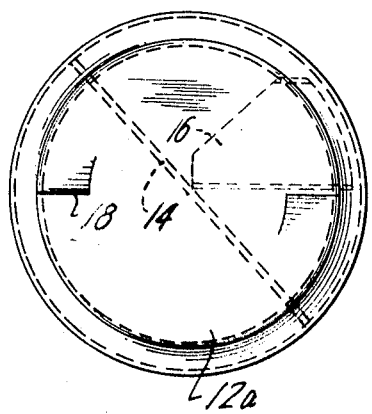
FIG. 3 is a plan view of the container top portion.
Figure 1:
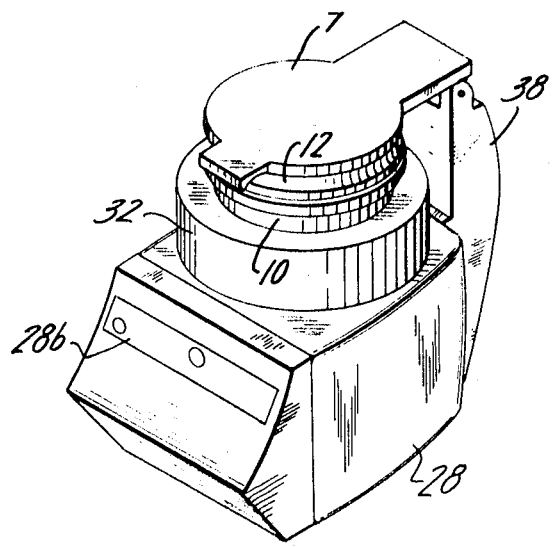
FIG. 1 is an isometric view of the mixer and container.
Figure 2:
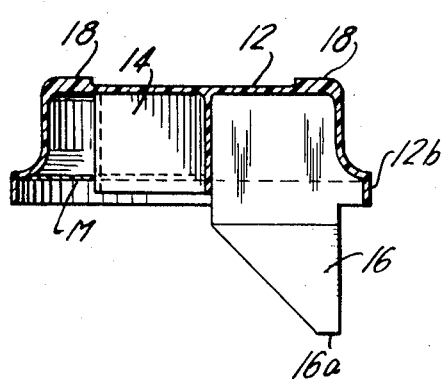
FIG. 2 is a sectional side view of the container top portion.

Referring to the drawing, the container for storing and intermixing the ingredients for dental applications, in accordance with the present invention, has a bottom portion 10 and a top or cover portion 12. One of the mixing ingredients which is stored within the container top 12, and which may be in the form of a liquid, is held within the space or compartment 12a formed by a portion of the interior wall of the container top, and the divider wall 14.

The mixing ingredient is confined within the compartment or space 12a through a thin sheet of material in the form of a membrane or diaphragm stretched over the walls of this space, and defined by a portion of the interior wall of the container top and the divider wall 14. Membrane M may be made of foil, plastic, etc.

Figure 4:
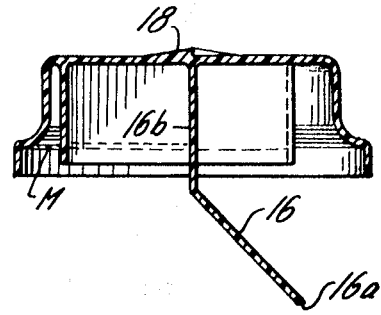
FIG. 4 is a sectional side view of the container top taken perpendicular to the side view of FIG. 2.

In the remaining interior space of the container top, a mixing paddle or mixing blade 16 is integrally mounted with the structure of the container top. The mixing plate or paddle portion 16 projects out of the interior of the container top, and into the container bottom when the latter is assembled to the top or cover 12. To assure thorough mixing and fine dispersion of the ingredients throughout of the mixture, the mixing paddle or blade 16 is inclined at an angle of, for example, 45°- with respect to the plane passing through the circular rim of the top portion 12, as shown in FIG. 4. Optimum intermixing of the ingredients is further realized by providing the mixing paddle portion 16 with a flat bottom edge which sweeps the interior surface of the container bottom. The bottom edge is indicated by the reference 16a.

To grip and retain the container top 12 stationary during the mixing process in which the container bottom is rotated, clamping or gripping portions 18 are provided on the upper surface of the container top or cover. Portions 18 engage corresponding mating portions 8 on the lower side of the retaining member 7. Any other suitable means, such as mating claw-shaped or wedge-shaped portions may be used.

A wall 16b, furthermore, within the interior of the container top not occupied by the space 12a for storing the mixing ingredient, holds securely the mixing paddle portion 16 projecting into the container bottom during the mixing process. The latter has a rim 10a which fits securely to the rim 12b of the container top. The internal diameter of the rim 10a is somewhat larger than the external diameter of the rim 12b, and therefore the latter fits within the rim 10a. These two rim diameters contact each other securely so that the container top is seated well onto the container bottom or base during storage of the mixing ingredients. At the same time, these two rim diameters are not pressed together so tightly that they interfere with the mixing device during which the container top or cover is held stationary while the bottom 10 is rotated.

The interior of the container bottom 10 is provided with a pole-shaped portion 20, which is hollowed out through a square-shaped recess 22. A rotating spindle, to be described, is inserted into the square-shaped recess 22 for the purpose of rotating the container bottom. The square-shaped cross section of the recess 22 and of the corresponding spindle used to rotate the container bottom 10 serves to provide a firm nonslipping grip between the spindle and the container bottom. To cut the membrane or diaphragm confining the fluid within the container top or cover, a knife edge portion 24 is provided on the wall of the container bottom 10. When the container is being stored with the mixing ingredients, the knife edge portion 24 lies well outside the area covered by the membrane or diaphragm stretched over the area 12a. When the container is, however, inserted into the mixing device, and the container bottom is rotated relative to the top, the knife edge portion 24 cuts directly into the membrane along the circular-shaped wall of the container top, and thereby allows the ingredients within the space 12a to drop into the container bottom.

The container, in accordance with the present invention, may be made of disposable material such as plastic, so that the container may be discarded after usage. The container may also, on the other hand, be of a more durable material such as stainless steel. In that case, the container is reusable and the membrane covering the container top portion 12a, as well as the knife edge portion 24 would be essentially omitted in the construction of the container.

To rotate the container bottom for purposes of mixing the ingredients, a motor 26 within the housing or case 28 rotates the spindle 30 which projects within the square-shaped recess 22 for the mixing process. Thus, the spindle 30 is mechanically coupled to the shaft of the motor 26. Aside from the square-shaped portion 30a, the spindle 30 also has a threaded portion 30b. The latter receives a turntable 32 which is correspondingly threaded through the opening 32a for seating upon the spindle 30 during rotation. The turntable 32 supports the container bottom during rotation, and assures that the ingredients will not accidentally spill out of the container during the mixing process.

To facilitate the thorough mixing of the ingredients, it has been found advantageous to carry out the mixing process under a slight vacuum. A small diameter duct 30c is provided, for this purpose, within the spindle. By means of the stem portion 30d, the duct 30c is made to communicate with a vacuum pump 34. The latter may be connected to the stem 30b through the application of a flexible tube or hose, for example. The vacuum is communicated to the interior of the container bottom 10 via the opening 20a within the pole-shaped portion 20. A gasket 36 may be provided between the end of the spindle 30 and the bottom of the recess 22 for securing a better vacuum for the mixing process. The gasket 36 is, however, not absolutely essential for carrying out the process of the present invention, since the amount of vacuum which is to be provided is only of a relatively minute amount. Thus, normal leakage of air through the rims 10a and 12b will not interfere with the establishment of such a small amount of vacuum. By increasing the size or capacity of the vacuum pump, furthermore, it is possible to compensate against any amount of leakage which may typically prevail as a result of the relative motion between the rims of the two container portions.

The motor housing or case 28 has vent openings 28a for the purpose of cooling the driving motor 26 mounted within the housing 28. Attached to the rear of the housing 28, furthermore, is a bracket 38 to which the retaining member 7 is hinged. The retaining member 7 has an operative position in which it lies against the container top or cover 12 and holds the latter stationary during the mixing process. In the nonoperative position the retaining member 7 is oriented substantially at an angle of 90° to the position it occupies while in the operative state.

The rotation of the retaining member 7 about its hinged connection with respect to the rear bracket 38, is facilitated through a bar-shaped hinge member 40 of circular cross section and having two detents 40a and 40b. These two detents are displaced 90° from each other and are arranged relative to a spring-actuated ball which enters the detent that is moved in position coinciding with the ball. As a result of such spring-actuated ball and detent design, the retaining member 7 is positively indexed or held in either one of its two positions used in connection with the mixing process.

In lieu of the wedging, clamping or gripping portions used to hold the container top 12 stationary during the mixing process, pins 9 may be provided on the underside of the retaining member 7. Pins 9 may be made to cooperate with corresponding recesses formed within the container top 12, so that pins 9 hold the latter stationary during rotation of the container bottom. Whereas, wedging, clamping or gripping portions or the pins may be separately used for this purpose of gripping the container top against rotation, a combination of such arrangements may be used for accomplishing this task.

The duration of the mixing process and hence the rotation of the motor 26, is established through the timer 42. The latter is set by the user of the mixer since different ingredients to be mixed will, in general, require a different mixing time due to their chemical characteristics and quantitative amounts. The timer 42 is of the variable setting type which allows the user to apply varying mixing times. The incorporation of such a timer 42 further enhances the mixing arrangement of the present invention, because it eliminates the requirement for the user to exercise judgement for estimating the elapsed time during mixing. The timer 42 is of the conventional design, well known in the art, and for this reason is not further described.

A lamp 44 connected in series with a resistor 46, is also connected to the motor 26 to indicate to the user when the motor is in operation. Thus, for as long as the lamp 44 lights, the user is notified that the mixing process is in progress. The lamp 44 is of the neon type, and for this reason a resistor 46 is connected in series with the lamp so that the latter may be used in conjunction with the voltage supplied by a conventional utility outlet.

The vacuum pump 34 is also connected across the motor terminals, because the pump is required to be in operation only during the time when the motor 26 is operating. Accordingly, the vacuum pump and motor are operated during a time interval determined by the timer 42.

In operation, the container with parts 10 and 12 is placed onto the turntable 32 and the retaining member 7 is moved downward so as to bear against the upper surface of the container top 12. The timer 42 is then set by the user through rotation of the shaft 42a protruding through the control panel 28b of the housing 28. Rotation of this shaft 42a will, in the conventional timer design, wind a spring within the timer proportional to the amount of time set. Upon such setting of the timer, the lamp 44 will immediately light and the motor 26 will commence to rotate. At the same time, the evacuating pump 34 will produce a slight vacuum within the container. After the time interval set by the user has expired, a switch within the timer 42 will automatically disconnect the motor 26, vacuum pump 34, and lamp 44 from the power line 48 fed from a conventional utility outlet through a conventional plug 50.

The container may be provided with a narrow strip of adhesive overlapping the rim of the container top and bottom, for the purpose of sealing the contents within the container during storage. Such a narrow strip of adhesive may then be removed by the user, prior to placing the container within the turntable for mixing the ingredients.

While the invention has been described and illustrated with respect to certain preferred examples, it will be understood by those skilled in the art after understanding the principle of the invention, that various changes and modifications may be made without departing from the spirit and scope of the invention.

What is claimed is:

1. A mixing device comprising a container having separable top and bottom portions and adapted to hold a separate ingredient in each of its portions, a support member for supporting said container at its said bottom portion, motor means, means for connecting said bottom portion of said container to said motor means for rotating said bottom portion, retaining means for gripping said top portion and holding said top portion stationary while said bottom portion is being rotated, said top portion of said container having a thin bottom wall and a mixer extending into said bottom portion of said container, said bottom portion of said container having cutting means to slit said thin bottom wall of said top portion of said container upon rotation of said bottom portion of said container whereby the ingredient in said top portion of said container may drop into said bottom portion of said container to be mixed with the ingredient in said bottom portion of said container by said mixer.

2. The mixing device as defined in claim 1, and timing means for establishing the interval of time during which said motor means is operated, said bottom portion of said container being rotated relative to said top portion of said container during said interval of time.

3. The mixing device as defined in claim 1 including means for hingeably securing said retaining means to said support member.

4. The mixing device as defined in claim 3 including a bracket member secured to said support member and hingeably supporting said retaining means.

5. The mixing device as defined in claim 1 wherein said bottom portion of said container has a recess into which said connecting means projects for rotating said bottom portion.

6. The mixing device as defined in claim 1 wherein said retaining member has means cooperating with means on said top portion of said container for holding said top portion stationary during rotation of said bottom portion of said container.

7. The mixing device as defined in claim 1 wherein said retaining member has at least one portion projecting into a corresponding recess in said top portion of said container for holding said top portion stationary during rotation of said bottom portion.

8. The mixing device as defined in claim 1 wherein said timing means is adjustable for varying the length of said time interval for operation of said motor means.

9. The mixing device as defined in claim 1 including light emitting means connected to said timing means for emitting light when said motor means is in operation during said interval of time.

10. The mixing device as defined in claim 1 including vacuum generating means connected to said timing means and communicating with the interior of said bottom portion of said container for generating a substantially small vacuum within said container during said interval of time.

11. A container for storing ingredients to be later mixed therein, said container comprising two separable engaging portions, top and bottom respectively, each of said portions having a cavity for retaining and confining ingredients therein, said bottom portion having an opening at its upper end, said top portion covering said opening when said top portion lies against said bottom portion with said cavities in communicable position; membrane means for covering the cavity in said top portion to confine an ingredient therein to be later mixed within the cavity of said bottom portion; and a mixing member secured to said top portion and extending into the cavity of said bottom portion so that said mixing member traverses the cavity of said bottom portion when said bottom portion rotates relative to said top portion, whereby ingredients within said bottom portion are mixed by said mixing member.

12. The container as defined in claim 11, including cutting means on said bottom portion for severing said membrane so that said ingredient is free to drop into said bottom portion.

13. The container as defined in claim 11 including partitioning means within the cavity of said top portion for subdividing the space thereof into at least two compartments.

14. The container as defined in claim 13 wherein said membrane means covers at least one of said compartments to confine an ingredient to be later mixed within the cavity of said bottom portion.

15. The container as defined in claim 14 including cutting means on said bottom portion for severing said membrane so that said ingredient within said one compartment is free to drop into said bottom portion.

16. The container as defined in claim 11 wherein said top portion has engaging means whereby said top portion may be held stationary during rotation of said bottom portion.

17. The container as defined in claim 11 wherein said mixing member extends angularly into the cavity of said bottom portion.